J. B. LEE.
ELECTRIC LIGHTING.
APPLICATION FILED JULY 31, 1911. RENEWED FEB. 16, 1916.
1,198,858.
Patented Sept. 19, 1916.
3 SHEETS—SHEET 1.
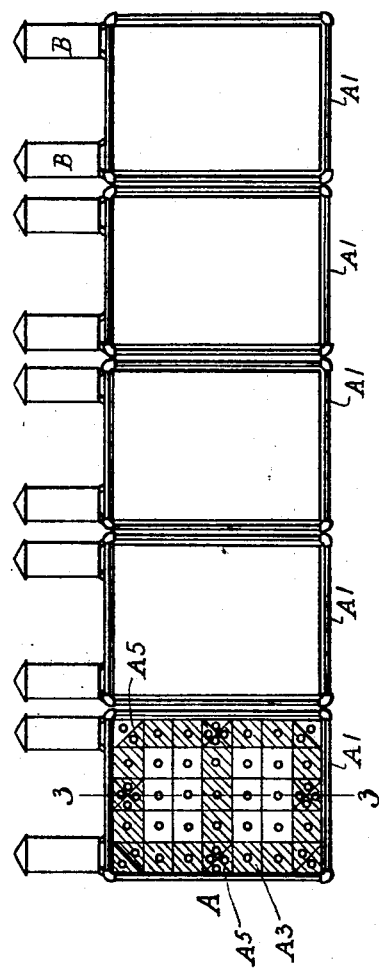
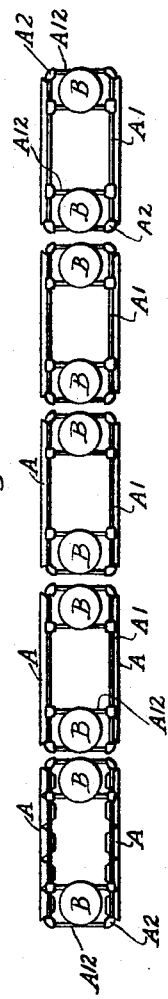
WITNESSES
INVENTOR
James B. Lee
By Cyrus Kehr
Attorney

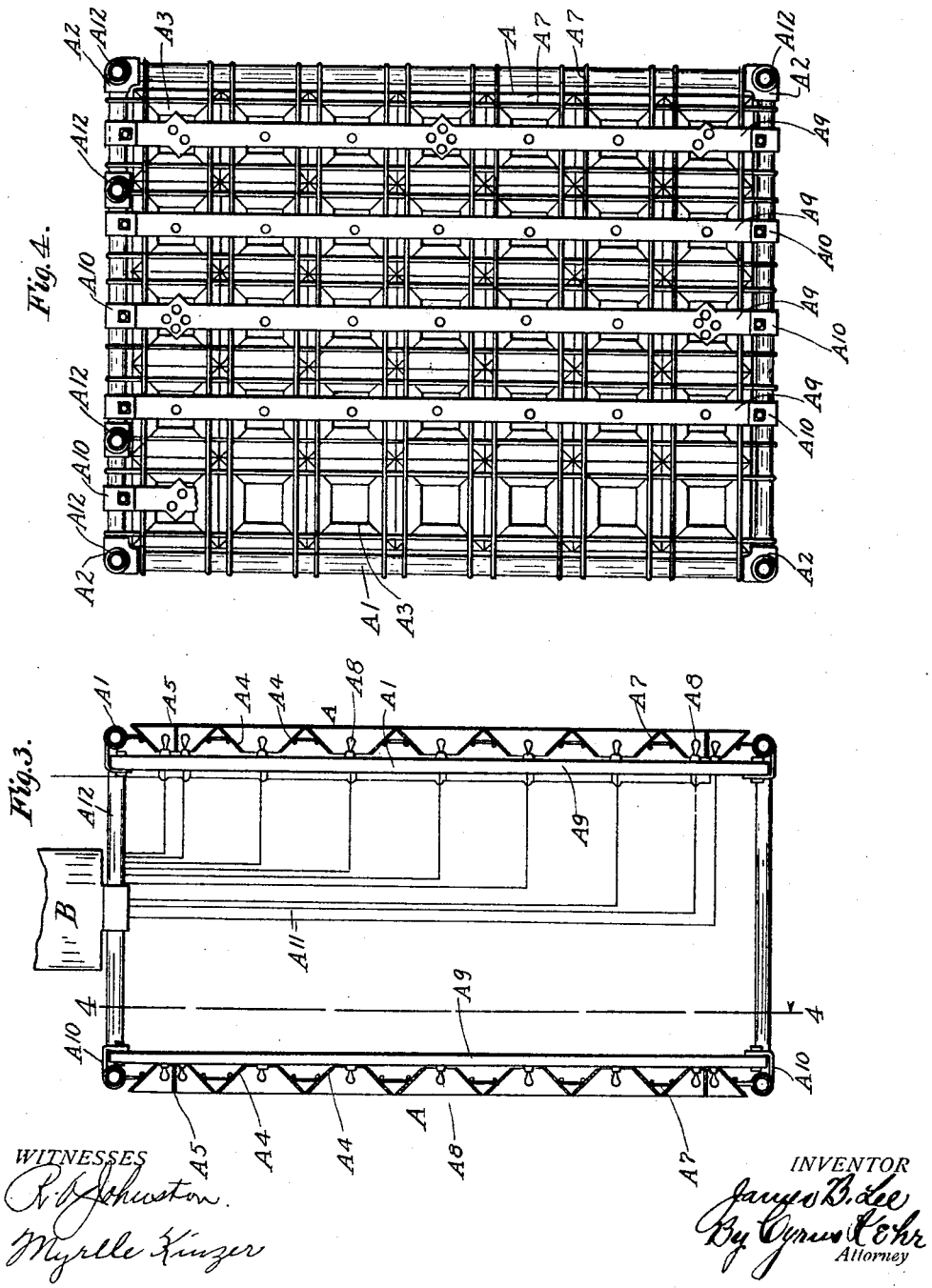

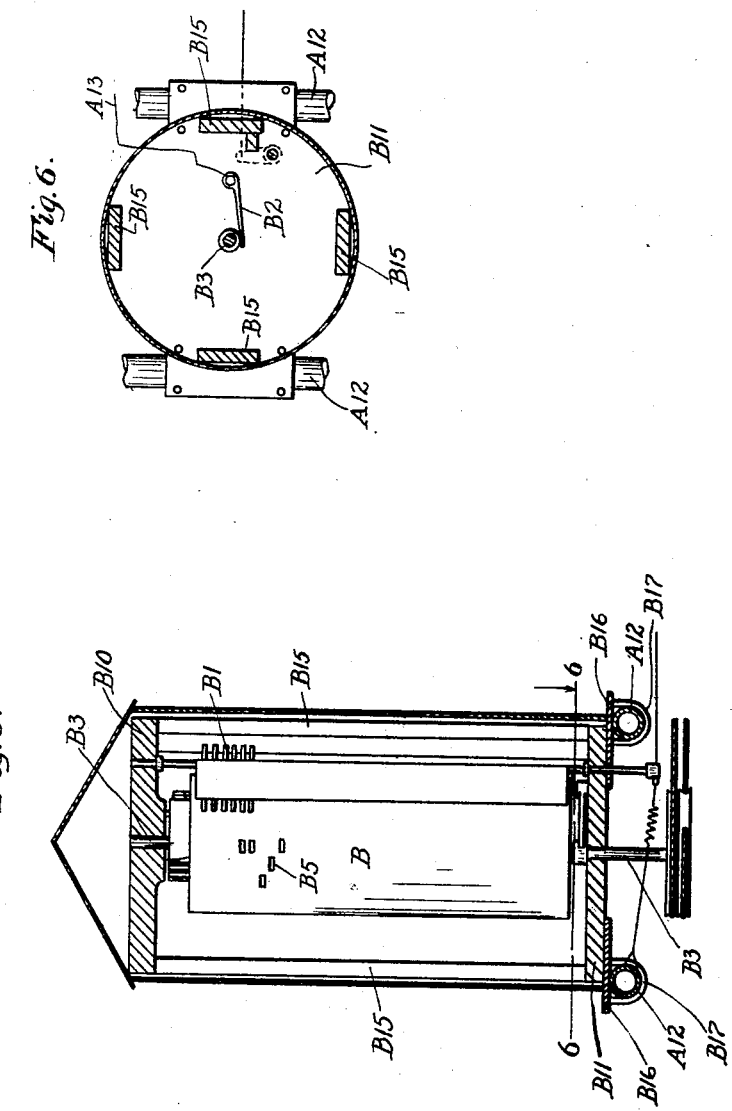

UNITED STATES PATENT OFFICE.

JAMES B. LEE, OF SAVANNAH, GEORGIA.

ELECTRIC LIGHTING.

1,198,858.   Specification of Letters Patent.   Patented Sept. 19, 1916.

Original application filed March 7, 1910, Serial No. 547,803. Divided and this application filed July 31, 1911, Serial No. 641,446. Renewed February 16, 1916. Serial No. 78,786.

*To all whom it may concern:*

Be it known that I, JAMES B. LEE, a citizen of the United States, residing at Savannah, in the county of Chatham and State of Georgia, have invented a new and useful Improvement in Electric Lighting, of which the following is a specification, reference being had to the accompanying drawing.

My improvement relates to electric lighting apparatus in which a plurality of electric lamps are arranged near each other to form a "light field" any portion of which may be illuminated for the forming of a letter, figure, picture, arbitrary sign, or other representation, such lamps being connected by electrical conductors with circuit-closing or switch mechanism for manually or automatically temporarily closing the circuits for the lamps standing in proper position to form such letter, figure, picture, sign, or other representation.

The lamps may be arranged in a single field for successively presenting only one such character or representation, or there may be a plurality of such fields arranged adjacent to each other in the range of vision of a person at a suitable distance, and so that a number of representations may be simultaneously made, one in each of said fields. In the drawings hereinafter described a plurality of such fields are shown, each being formed within a rectangular, open frame so that at the same time the various letters of a word or a succession of words may be presented, one letter in each field.

The circuit-closing or switch mechanism to be used for the opening and closing of the various circuits upon which the lamps are located may be of any desired form or construction known to this art. Hence only a general description of such mechanism need be given herein. For a full description of such a mechanism, reference is here made to my application, Serial No. 547,803, filed March 7, 1910, for Letters Patent of the United States for an improvement in "electric lighting," of which application this application is a division.

Figure 1 is an elevation showing a light field arranged in a frame and showing alongside of said frame four other similar frames each adapted to receive one light field; Fig. 2 is a plan of the apparatus shown by Fig. 1; Fig. 3 is an upright section on the line, 3—3, of Fig. 1, looking toward the left; Fig. 4 is a section on the line, 4—4, of Fig. 3, looking toward the left; Fig. 5 is a sectional view of one of the circuit-closing cylinders and the housing for such cylinder; Fig. 6 is a section on the line, 6—6, of Fig. 5.

Referring to said drawings, A is a light field, one such field being in elevation in the left hand portion of Fig. 1, ten such fields being in plan in Fig. 2, two being in upright section in Fig. 3, and one being shown in rear elevation in Fig. 4. In Fig. 1 are four frames, $A^1$, located horizontally in line with the field, A, and each adapted to receive such a field, thus placing five such fields in horizontal alinement, each adapted for the forming of one letter in a word of five letters, if such fields are used for representing letters. If such fields are used for pictorial representation, each field may be used for a distinct pictorial representation, or each of the several fields may be used to form a portion of a larger pictorial representation.

The frames shown by the drawings are double, two frames being opposite and parallel to each other and joined to each other by cross bars, $A^{12}$, and each frame being adapted to support a light field facing away from the light field supported by the other such frame. Said frames are duplicates, and the light fields are duplicates. Hence a description of one such frame and the light field supported thereby and the circuit for operating such field will serve as a description of all the frames and light fields. Each such frame is designated by $A^1$ and is shown rectangular and having elbows, $A^2$, at the corners. In the form shown in the drawings, the width of the frame is to the length thereof as 5 is to 7. This permits dividing the space within said frame into five upright rows and seven horizontal rows of square compartments, $A^3$. These compartments are in the form of truncated four-sided pyramids, the base being directed toward the front and there being an opening at the rear—in the plane of truncation, so that wind may pass through each of said compartments, to reduce wind strain on the apparatus. The walls, $A^4$, of said compartments are preferably formed of sheet metal and the meeting edges of adjacent compartments joined to each other in any suitable manner, as by means of soldering, so that the entire group of compartments becomes a single body, as would be the case if an equal number of square tin pans having sloping sides were in this manner joined to each other. Certain of those compartments are preferably sub-divided as shown by the drawings, wherein each compartment in the four corners of the frame or field is divided by a partition, $A^5$, extending obliquely from the adjacent end edge to the adjacent side edge of the field, and each of the middle compartments in the four outer rows of compartments is divided by two partitions crossing each other at right angles and extending to the corners of the compartments, thus forming in each such compartment four sub-compartments. The walls of these compartments perform two functions, first to limit the lateral range of the illumination and thus aid in giving a definite margin to the figure or character to be formed, and, second, to reflect the light forward perpendicularly away from said field.

The group of compartments may be secured to the frame in a variety of ways. The drawings show, for this purpose, upright and horizontal stay wires, $A^7$, having their ends bent around the frame, $A^1$, and lying against the outer faces of the walls, $A^4$, of the compartments and secured to said faces by any suitable means, as, for example, soldering (see Figs. 3 and 4). This construction brings such a wire against each outer face of each such compartment and brings said compartments into the plane of the frame, a portion of each compartment being forward and a portion being rearward of said plane, (see Fig. 4).

Into each such compartment and sub-compartment is placed an incandescent electric lamp, $A^8$, the base thereof being in or rearward of the rear opening of the compartment or sub-compartment, such rear opening being, preferably, larger than the base of the lamp so that a passage for air is left around the lamp.

The lamps, $A^8$, are secured to the lamp-supporting bars, $A^9$, placed upright behind and opposite and at a short distance from each upright row of compartments and having their ends secured to binding members, $A^{10}$, which members are also secured to the frame, $A^1$. Said bars are enlarged where they receive the lamps of the sub-divided compartments.

Individual current-conducting wires, $A^{11}$, lead to the lamps as shown diagrammatically in the right hand portion of Fig. 3. Said wires extend to brushes, $B^1$, which are arranged to bear upon an upright, insulated, metallic, circuit-closing cylinder, B, having an upright axle, $B^3$, having bearings in the top plate, $B^{10}$, and the bottom plate, $B^{11}$, the top plate, $B^{10}$, being supported on four upright columns, $B^{15}$, and said columns resting on the bottom plate, $B^{11}$, and the latter having extension plates, $B^{16}$, resting on the upper frame cross-bars, $A^{12}$, and secured to said bars by U-shape binding members, $B^{17}$. Said brushes are arranged in a row parallel to and adapted to bear upon the surface of the cylinder. A brush, $B^2$, is mounted upon the bottom plate, $B^{11}$, and arranged to bear upon the axle, $B^3$, of the cylinder, B; and a lighting current wire, $A^{13}$, leads from any source of generation of said current to said brush. From the foregoing it will be understood that when any one of the brushes, $B^1$, is in contact with the cylinder, current will flow through the corresponding lamp, $A^8$, and cause the illumination of the same. Said cylinder is adapted for rotation to bring different longitudinal portions of its surface opposite the brushes, $B^1$, provision being made, as described in my said original application, Serial No. 547,803, for placing said cylinder at rest in arbitrarily chosen portions of one complete rotation, such portions being equal in number to the number of letters of the alphabet plus any other characters to be used in operating the apparatus (if the apparatus is to be a reading sign). To make up one representation in the light field, the brushes, $B^1$, in communication with the lamps which must be illuminated for making such representation and to be placed in electrical contact with said cylinder. In the form shown in the drawings, the brushes are so supported as to normally stand away from the face of the cylinder, and the cylinder is formed with apertures or slots, $B^5$, into which the brushes may extend without making contact, the face of the cylinder is formed with such slots or apertures in proper positions to come opposite all of the brushes communicating with lamps which are to remain dark. This involves the placing of such apertures in slots grouped in rows parallel to the cylinder axis, the group in each row corresponding to the lamps which are to remain dark during a given representation in the light field.

In the light field as shown in Fig. 1, there are fifty-one lamps and this calls for fifty-one brushes, $B^1$, and fifty-one spaces in each contact line in which there may be (if needed) an aperture for avoiding contact of the corresponding brushes, in order that the corresponding lamps may remain dark.

I claim as my invention:

1. In an apparatus of the nature described, the combination of a light field comprising a group of distinct compartments open at the front and at the rear, the edges of which meet and lie parallel to the edges of adjoining compartments and are joined thereto, electric lamps in such compartments, and electric conductors leading to said lamps, substantially as described.

2. In an apparatus of the nature described, the combination of a light field comprising a group of rectangular, distinct compartments open at the front and at the rear, arranged in horizontal and upright rows with adjacent edges parallel to each other and meeting, electric lamps in such compartments, and electric conductors leading to said lamps, substantially as described.

3. In an apparatus of the nature described, a light field, walls dividing said field into uniform, rectangular, compartments standing in rows which are parallel to each other in two directions and which compartments fill a rectangular parallelogram, the compartment at each corner of said parallelogram being divided into two compartments by an oblique wall extending across the angle formed by the adjacent sides of the parallelogram, and the compartment midway between each two corners being divided by two oblique intersecting walls into four sub-compartments, and a lamp in each compartment and sub-comparment substantially as described.

4. In an apparatus of the nature described, a light field, walls dividing said field into uniform rectangular major compartments standing in rows which are parallel to each other in two directions and which compartments fill a rectangular parallelogram, a portion of said compartments being subdivided into minor compartments by diagonal walls, a portion of the minor compartments being in such relation to adjoining major compartments as to adapt them to, independently of the companion minor compartments, become portions of characters of which said adjoining major compartments form a part, and a lamp in each major compartment and minor compartment, substantially as described.

5. In an apparatus of the nature described, the combination of a light field comprising a group of compartments open at the front and at the rear, lamp supports located behind said compartments and having spaces between each other, electric lamps supported by said supports and extending into said compartments, and electric conductors leading to said lamps, substantially as described.

6. In an apparatus of the nature described, the combination of a light field comprising a group of rectangular compartments open at the front and at the rear, bars located rearward of said compartments parallel to the plane of said group of compartments and having spaces between each other, electric lamps supported by said bars and extending into said compartments, and electric conductors leading to said lamps, substantially as described.

7. In an apparatus of the nature described, the combination of a light field comprising a group of compartments open at the front and at the rear, a portion of said compartments being sub-divided into minor compartments by diagonal walls, lamp supports located behind said compartments, electric lamps supported by said supports and extending into said compartments, and electric conductors leading to said lamps, substantially as described.

8. In an apparatus of the nature described, the combination of a light field comprising a group of compartments open at the front and at the rear, a portion of said compartments being sub-divided into minor compartments by diagonal walls, a frame surrounding and supporting said group of compartments, lamp supports located behind said group of compartments and supported by said frame, electric lamps supported by said supports and extending into said compartments, and electric conductors leading to said lamps, substantially as described.

9. In an apparatus of the nature described, the combination of a rectangular, open frame, upright and horizontal stay wires extending across the opening in said frame, light field compartments occupying the spaces between said wires and supported by the latter and open at the front and at the rear, electric lamps in said compartments, and electric conductors leading to said lamps, substantially as described.

10. In an apparatus of the nature described, the combination of a rectangular, open frame, upright and horizontal stay wires extending across the opening in said frame, truncated pyramidal light field compartments occupying the spaces between the stay wires and supported by the latter and being open at the front and at the rear, electric lamps in said compartments, and electric conductors leading to said lamps, substantially as described.

11. In an apparatus of the nature described, the combination of a rectangular, open frame, upright and horizontal stay wires extending across the opening in said frame, light field compartments having their edges joined and occupying the spaces between the stay wires and supported by the latter and being open at the front and at the rear, electric lamps in said compartments, and electric conductors leading to said lamps, substantially as described.

12. In an apparatus of the nature described, the combination of a rectangular, open frame, upright and horizontal stay wires, extending across the opening in said frame, light field compartments open at the front and at the rear occupying the spaces between said wires, the stay wires resting against the outer face of each compartment, electric lamps in said compartments, and electric conductors leading to said lamps, substantially as described.

13. In an apparatus of the nature described, the combination of a rectangular, open frame, upright and horizontal stay wires extending across the opening in said frame, light field compartments open at the front and at the rear occupying the spaces between said wires and extending to opposite sides of the plane of said frame, electric lamps in said compartments, and electric conductors leading to said lamps, substantially as described.

14. In an apparatus of the nature described, the combination of a rectangular, open frame, upright and horizontal stay wires extending across said frame, light field compartments open at the front and at the rear, and located in the spaces between said wires, bars located behind and near said compartments and having their ends secured to said frame, electric lamps supported by said bars and extending into said compartments with air passages beside said lamps, and electric conductors leading to said lamps, substantially as described.

15. In an apparatus of the nature described, the combination of two light fields located opposite and parallel to each other and supported by framing and each comprising a group of compartments open at the front and at the rear, electric lamps in such compartments, and electric conductors leading to said lamps, substantially as described.

16. In an apparatus of the nature described, the combination of two sets of horizontal and upright stay wires, said two sets being located opposite and parallel to each other, framing supporting said wires, light field compartments open at the front and at the rear extending into the spaces between the wires of the same set of wires, electric lamps extending into said compartments, and electric conductors leading to said lamps, substantially as described.

17. In an apparatus of the nature described, the combination of two open frames located opposite and parallel to each other, two light fields, one being located within each such frame and each comprising a group of compartments open at the front and at the rear, electric lamps in such compartments, and electric conductors leading to said lamps, substantially as described.

18. In an apparatus of the nature described, the combination of two open frames located opposite and parallel to each other, upright and horizontal stay wires extending across the openings in said frames, light field compartments open at the front and at the rear located in the spaces between said wires, electric lamps located in said compartments, and electric conductors leading to said lamps, substantially as described.

In testimony whereof I have signed my name, at Knoxville, Tennessee, in presence of two witnesses, this twenty-ninth day of July, in the year one thousand nine hundred and eleven.

JAMES B. LEE.

Witnesses:
CYRUS KEHR,
MYRTLE KINZER.

Copies of this patent may be obtained for five cents each, by addressing the "Commissioner of Patents, Washington, D. C."